Sept. 8, 1925.
J. G. WINSOR ET AL
TRACTION WHEEL
Filed July 17, 1922
1,553,123
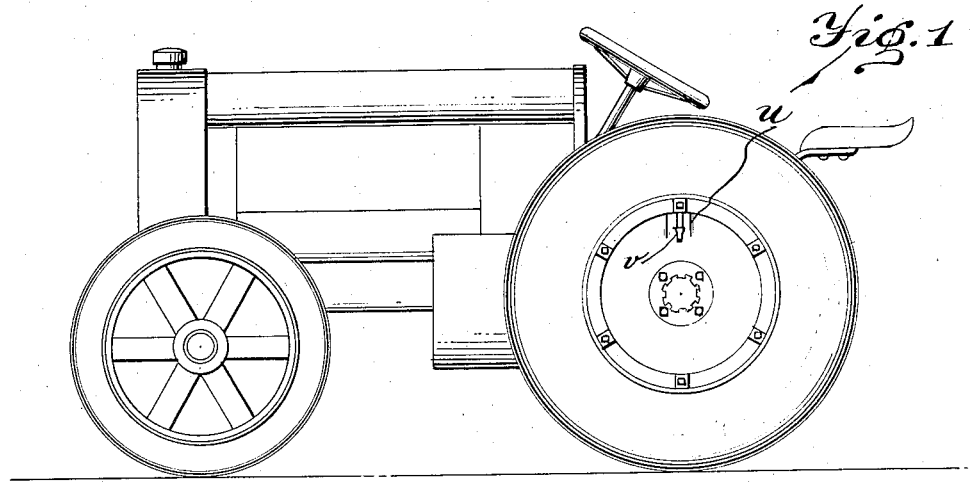
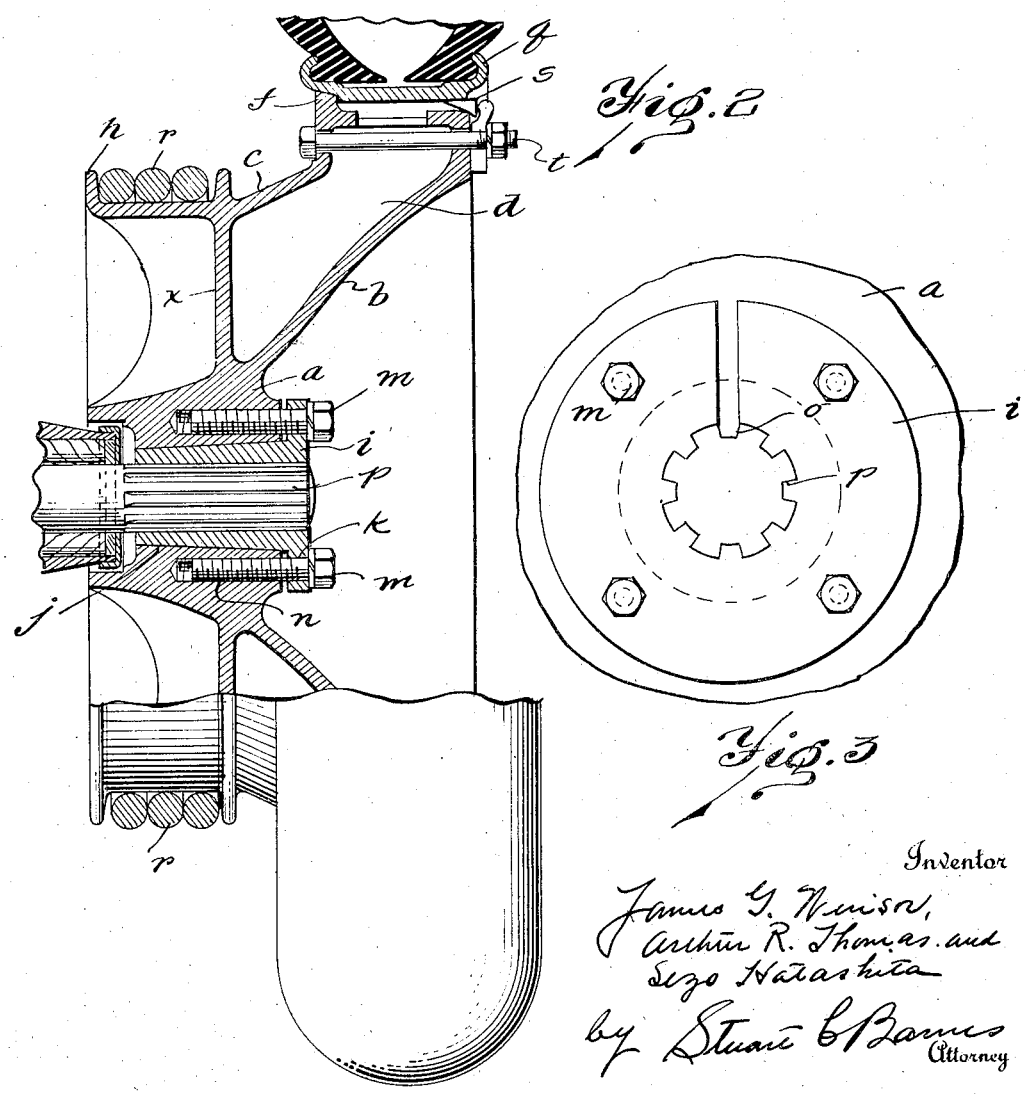

Patented Sept. 8, 1925.

1,553,123

UNITED STATES PATENT OFFICE.

JAMES G. WINSOR, ARTHUR R. THOMAS, AND SEZO HATASHITA, OF DETROIT, MICHIGAN.

TRACTION WHEEL.

Application filed July 17, 1922. Serial No. 575,465.

*To all whom it may concern:*

Be it known that we, JAMES G. WINSOR, ARTHUR R. THOMAS, and SEZO HATASHITA, citizens of the United States, and a subject of Japan, respectively, residing at Detroit, in the county of Wayne and State of Michigan, have invented certain new and useful Improvements in Traction Wheels, of which the following is a specification.

This invention relates to traction wheels and has for its object a wheel that is in particular designed to take place of the usual wheel used on the well known Fordson tractor. The wheels that come on the Fordson tractor are not equipped to take a pneumatic tire. Furthermore they are not standard gage, that is 56 inches. It is the object of the present invention to provide a wheel which can carry a standard pneumatic tire rim, a wheel which will afford a sufficient extension of the wheel gage to give the standard 56 inch gage and a wheel which at the same time will afford a spool or reel to wind a cable on, to pull the tractor out of places where traction cannot be obtained or to do useful work as a windlass when the wheel is jacked off the ground and the opposite wheel locked.

In the drawings,—

Fig. 1 is a side view of a Fordson tractor equipped with one of our improved wheels.

Fig. 2 is a fragmentary vertical section of the wheel.

Fig. 3 is an end elevation of the tapered driving and clamping sleeve used on the Fordson tractor for securing the wheel to the shaft.

In Fig. 1 we have shown the general outline of the well known Fordson tractor. However, our invention in its broad aspect is, of course, applicable to any other tractor. It is sought in the specification to show the aspects of the invention as applied to a Fordson tractor. These tractors ordinarily have rear traction wheels provided with diagonal cleats. The gage between the rear wheels is not the standard truck gage of 56 inches.

We employ a casting which forms a hub $a$, a vertical web $x$, two diagonal webs $b$ and $c$ with a cored out center $d$, and terminating in a felloe $f$ and spool or reel $h$. The interior of the hub is bored out and arranged to take the sleeve $i$ that comes with the Forson tractor to secure the traction wheel in driving relation with the shaft. This sleeve is provided with four openings $k$ to take the cap screws $m$ that screw into threaded sockets $n$ in the hub of the wheel. These tapering sleeves are splined as at $o$ and the splines fit into the splines $p$ on the end of the shaft. Consequently when the cap screws are tightened the tapered sleeve causes the splines of the sleeve and shaft to engage very tightly holding the wheel upon the end of the shaft. The two webs $c$ and $b$ are not vertical webs but diagonal webs forming a felloe which completely overhangs the end of the shaft and is offset from the plane of the end of the shaft. This gives the desired extension to provide increase in wheel gage at the same time the double web construction gives sufficient strength to sustain the load in this offset relation.

By offsetting the felloe from directly above the end of the shaft, it is possible to interpose a spool or reel $h$ upon which the cable $r$ may be wound in an emergency and tied to a nearby tree or other upright so that the tractor can pull itself out of the mire or any other difficult position which the traction wheels cannot negotiate by simple traction.

Any standard rim such as $q$ can be secured on the felloe with bolts and nuts $t$. The outer web $b$ is dented in as at $u$ to make room for the tire valve $v$.

What we claim is:

1. A gauge extension wheel for tractors or other vehicles, comprising a casting forming a hub which can be bolted removably to the end of the shaft and which is provided with a pair of spaced cast metal webs, one of which rises vertically from near the outer end of the hub and then extends outwardly obliquely to the felloe, the other web merging into the hub near such outer end and extending thence obliquely outward in the form of a bell-shaped member with considerable spacing with respect to such outer web, both ends terminating in a felloe which by reason of such oblique disposition of said two webs is offset substantially beyond the plane at the end of the hub, whereby the gauge of a tractor or other vehicle may be extended by applying a set of such wheels to the tractor vehicle axle.

2. A gauge extension wheel for tractors or other vehicles, comprising a casting forming a hub which can be bolted removably to the end of the shaft and which is provided with a pair of spaced cast metal webs, one of which rises vertically from the hub to form one end of a cable drum, thence extending inwardly to form the periphery of such drum and outwardly obliquely to the felloe, the other web extending from such hub obliquely outwardly in the form of a bell-shaped member in spaced relation with respect to said other web and terminating in a felloe, which felloe by reason of such oblique disposition of said two webs is offset substantially beyond the plane of the end of the hub, whereby the gauge of a tractor or other vehicle may be extended and whereby a cable drum is provided immediately above the end of the axle and clear of the other mechanism on the vehicle.

In testimony whereof we affix our signatures.

JAMES G. WINSOR.
SEZO HATASHITA.
ARTHUR R. THOMAS.